Patented July 6, 1926.

1,591,384

UNITED STATES PATENT OFFICE.

BENNO HOMOLKA, OF FRANKFORT-ON-THE-MAIN, GERMANY, ASSIGNOR, BY MESNE ASSIGNMENTS, TO GRASSELLI DYESTUFF CORPORATION, OF NEW YORK, N. Y., A CORPORATION OF DELAWARE.

MANUFACTURE OF DIAMINODIARYLDIALKYLMETHANES.

No Drawing. Application filed September 19, 1923, Serial No. 663,711, and in Germany September 29, 1922.

I have found that diaminodiaryldialkylmethanes are obtained by causing primary aminobenzenes with an unoccupied para-position, in the form of their salts and in aqueous solution to react upon aliphatic ketones.

The simplest representative of this class of bodies, viz the diaminodiphenyldimethylmethane, which may be obtained from aniline and acetone, corresponds to the formula:

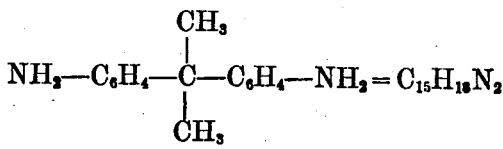

The analysis gives the following results:

| Found. | Calculated. |
|---|---|
| C =79.58% | 79.65% |
| H= 7.95% | 7.96% |
| N=12.44% | 12.39% |

The diaminodiaryldialkylmethanes form an important starting material for the preparation of dyestuffs of different kinds.

Example.

370 parts of aniline are dissolved with the required quantity of hydrochloric acid in about 1500 parts of water, then there are added 60 parts of acetone and the whole is heated for six hours in a vessel under pressure to about 120–150° C. The mixture having cooled down, it is made alkaline with caustic soda, sodium carbonate or quicklime, the excess of aniline is driven off by water vapour, and the remaining raw material crystallized from boiling water. Thus the diaminodiphenyldimethylmethane is obtained in the form of colourless, needle-like crystals melting at 132° C. It is soluble in diluted mineral acids, readily soluble in the common organic solvents, insoluble in cold water but slightly soluble in boiling water.

According to the same process there may be obtained from o-toluidine and acetone the diaminodi-o-tolyldimethylmethane (melting point 71° C.), from aniline and methylethylketone the diaminodiphenylmethylethylmethane melting at 78°.

Following the same process there may be obtained from acetone and o-anisidine the di-o-anisyl-dimethylmethane melting at 32° C., from o-phenetidine and acetone the liquid di-o-phenetidyl-dimethylmethane.

The parts by weight of the starting materials in the above example may be widely modified; instead of hydrochloric acid other acids, e. g. sulphuric acid, may be used.

By the term "a primary aminobenzene" I understand in the description and the following claims the aminobenzene itself or its derivatives containing the substituent in the nucleus.

Having now described my invention what I claim is:

1. As new products the diaminodiaryldialkylmethanes of the general formula:

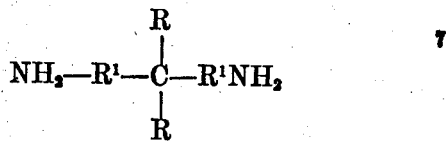

wherein R stands for an alkyl- and R¹ for an aryl residue, substituted or not, which are colorless substances melting without decomposition, insoluble in cold water and alkali, slightly soluble in boiling water, and readily soluble in the common organic solvents and mineral acids.

2. Process for preparing diaminodiaryldialkylmethanes which consists in causing a primary aminobenzene with an unoccupied para-position in the form of its salts to react upon aliphatic ketones.

In testimony whereof, I affix my signature.

BENNO HOMOLKA.